Aug. 30, 1960         J. W. CAMERON         2,950,973
COFFEE CONCENTRATE PROCESS
Filed March 26, 1957

FIG_1_

Roast coffee bean → 10 Grinding in special gaseous atmosphere ← Special gas
↓
11 Storage
↓
12 Vacuumizing & contact with special gas
↓
13 Extraction
↓
14 Displacement of residual concentrate ← Hot water 15 Can filling and sealing
16 Spray drying
Special gas
Coffee concentrate
Treatment with gas ← Hot water
Special gas
Spent grounds

FIG_2_

INVENTOR.
Jack W. Cameron
BY
ATTORNEYS

United States Patent Office 2,950,973
Patented Aug. 30, 1960

2,950,973

COFFEE CONCENTRATE PROCESS

Jack W. Cameron, Burlingame, Calif., assignor to Vitagen Corporation, Los Angeles, Calif., a corporation of Nevada Filed Mar. 26, 1957, Ser. No. 648,612

7 Claims. (Cl. 99—71)

This invention relates generally to methods or processes for the manufacture of coffee concentrates, and to products resulting from such processes.

In the past aqueous coffee concentrates have been made by extracting ground roast coffee with hot water. Such concentrates may be spray dried with or without further concentration by evaporation, to form so-called instant coffee. Coffee beverage made by the use of such concentrates compare poorly with fresh coffee beverage made from the original roast ground coffee. Flavor and aroma are seriously impaired, and the concentrate contains undesirable solids tending to settle out as a sludge. The effective yield of the process is relatively poor compared to the process of the present invention, which is reflected in the cost of manufacture. The concentrate is subject to spoilage and has not been marketed by itself to the consumer trade, except to a limited extent in frozen form.

In general it is an object of the present invention to provide a process making possible the production of a coffee concentrate of improved flavor and aroma.

Another object of the invention is to provide a process of the above character which will give a relatively high yield, while at the same time providing a concentrate having a minimum percentage of solids subject to settlement.

Another object of the invention is to provide an aqueous coffee concentrate that has good keeping properties, and which can be placed in sealed containers and kept without refrigeration for extended periods of time.

Additional objects and features of the invention will appear from the following description in which the preferred embodiment has been set forth in detail in conjunction with the accompanying drawing.

Referring to the drawing:

Figure 1 is a flow sheet illustrating one procedure for carrying out the present process.

Figure 2 is a side elevational view illustrating apparatus which can be employed for the extraction operation.

The present process employs the extraction of roast ground coffee by percolating hot water through a mass of the same, as in the prior processes previously mentioned. A unique feature of the present process is the use of a special gas which makes possible the new results and advantages hereinafter described. The special gas is one of the type described in Dunkley 2,490,951, which is produced by the controlled burning of a hydrocarbon fuel gas with an amount of combustion supporting air that is insufficient for complete combustion.

The particular gas generating method which I prefer to employ is disclosed and claimed in my copending application filed of even date herewith, entitled "Gas Generating Method and Apparatus." Assuming the use of natural fuel gas, the special gas includes nitrogen, carbon dioxide, carbon monoxide, hydrogen, methane, and acetylene, together with small amounts of highly active gaseous products which can be termed unsaturates, and which are believed to result from the interaction of hydrogen, carbon dioxide, carbon monoxide, and unsaturated hydrocarbons in the presence of water vapor.

Figure 1 illustrates a suitable procedure for carrying out the present process. Roast coffee bean is ground in step 10 by the use of suitable grinding equipment such as is commonly used in the coffee industry. Undue fineness of grind is avoided. In practice good results are secured when the bulk of the ground particles will pass through a No. 100 screen, but will remain upon a No. 150 screen. The working parts of the grinder are enclosed and special gas of the type previously described is supplied whereby the grinding operation in effect takes place in an atmosphere of the gas. This serves to expose the freshly ground particles to the action of the special gas, and to prevent contact with the atmosphere. Immediately following grinding, the ground coffee is stored at 11 in suitable sealed enclosures, such as sealed moisture proof bags. Such bags may be made of suitable plastic material, such as Pliofilm, Saran, or polyethylene. Storage is continued over a substantial period of time such as from three to five days, during which time a substantial amount of carbon dioxide is evolved.

After storage, the ground coffee is subjected to vacuumizing and gassing in step 12. This step can be carried out by placing the coffee in a sealed container, after which a vacuum is applied equivalent to from 25 to 29 inches mercury column. The vacuum is broken by introduction of the same special gas referred to above. This treatment serves to remove most of the carbon dioxide gas evolved during storage in step 11, and again contacts the ground particles with the special gas. The special gas so supplied is not diluted by carbon dioxide evolved during storage. Following step 12 the ground coffee is subjected to the extraction operation 13, which can be carried out by the use of suitable percolating equipment. In this extraction operation hot water is percolated through a mass of the ground coffee, thereby extracting the desired soluble constituents, and producing the desired aqueous concentrate. The hot water applied to the coffee can be at a temperature level of the order of 190 to 200° F.

A feature of the present process is that instead of using ordinary hot water, it is first treated by the same special gas referred to above. This treatment can involve sparging the water with the special gas, or in other words bubbling the gas into the water. Application of this treatment of the water appears to considerably increase the quality of the concentrate, having reference particularly to flavor and aroma, and it facilitates obtaining the desired concentrate with a high degree of consistency for successive runs. In addition to supplying hot water which has been treated with the special gas, I prefer to supply special gas to the extraction operation continuously, and to continuously bleed away such gas. As will be presently explained, in practice extraction is carried out in a closed sealed vessel, and at a pressure substantially above atmospheric.

In step 14 the residual liquid fraction remaining with the ground coffee can be displaced by hot water, and returned to the process as indicated. Here again it is desirable to employ hot water after treatment with the special gas.

The liquid coffee extract obtained from the extraction operation 13 can be used as such, or as indicated in step 15, can be introduced into aseptic cans, and the cans sealed for marketing. Such can filling and sealing operations are preferably carried out in an atmosphere of the special gas as indicated. Also it is desirable to displace air from the cans being supplied to the filling and sealing operations, by use of the special gas.

In some instances it may be desirable to reduce the concentrate to the form of a dry powdered product, or "instant" coffee. In such event the concentrate can be supplied to the spray drying operation 16, with or without further vacuum evaporation.

The apparatus illustrated in Figure 2 can be used for carrying out both operations 12 and 13. It consists of a vertical container 21 having a removable cover 22. A suitable screen (not shown) is mounted in the lower end of the container, and additional screens together with a suitable filter membrane, are mounted in the upper end. Pipe 23 serves to introduce hot water into the lower end of the container, below the lower screen. The entire container can be subjected to continuous vibration by means of the vibrating device 24. Pipe 25 may serve to introduce the special gas. Above the upper screen and filter, the container makes connection with the pipes 26 and 27 and the vacuum gauge 28. Pipe 26 may connect with a vacuum pump or other suitable evacuating means, while pipe 27 serves to discharge the coffee concentrate. Pipe 29 may be employed to bleed off gas at a controlled rate and pipe 30 serves as a drain. The container can be provided with a jacket 31, through which hot water is circulated by means of inlet and outlet pipes 32 and 33.

The equipment shown in Figure 2 is operated as follows: The cover 22 of the container is removed, vibrator 24 put into operation, and the ground coffee poured in until the container is substantially filled. The upper screen and the filter membrane are then applied and the cover 22 secured in position. Pipe 26 is connected to an evacuating pump and the container evacuated over a period of about 20 seconds, during which time the vacuum within the container increases rapidly to a value of the order of 25 inches mercury column. After closing line 26 the vacuum is broken by admitting the special gas through line 25, thus causing the special gas to flush upwardly through the entire charge of coffee with a build-up of pressure to a value of say 5 p.s.i. Line 23 is now slowly opened whereby the treated hot water (under pressure) is introduced into the lower end of the retort with a slowly rising level through the mass of coffee. During initial introduction of the hot water the pressure in the container can be about 5 p.s.i. as mentioned above, which pressure is gradually increased until the pressure within the container is of the order of 50 to 55 p.s.i. within about five to ten minutes after initial introduction of the water. Special gas also is admitted through pipe 25 at a continuous rate, and at the same time such gas is continuously bled from the top of the container either through the vacuum connection 26, or through the separate valve controlled pipe 29. The special gas used for this purpose can be stored at a pressure of the order of 80 p.s.i., whereby it can be admitted at a controlled rate against the internal pressure of from 50 to 55 p.s.i. within the container. During these operations hot water is circulated through the jacket 29, whereby the material within the container is kept at the desired temperature level of from 190 to 200° F.

After the container is filled with the rising column of hot water, the liquid concentrate starts to flow through the line 27, to a convenient storage tank. Assuming proper controlled introduction of the hot water, the concentrate will give a reading of from 10 to 12½ Brix.

After the concentrate falls below the desired limits, introduction of hot water and gas is discontinued, and some of the remaining concentrate drained through pipe 30. The grounds can then pass to the concentrate recovery step 14, to recover the aqueous liquid fraction of the same, and this fraction can be joined with the liquid drained through pipe 30 and returned to the process.

It will be evident from the foregoing that at various stages in the extraction operation, there may be some variation in the concentrate. However assuming that the concentrate obtained in successive operations is blended together, the resulting material will be relatively uniform. Such variations in concentration as may occur can be corrected by further blending, before introducing the material into cans. Small amounts of additives can be employed, such as are commonly used with coffee concentrates, such as body imparting colloids and flavoring extracts.

The various advantages of the present process can be summarized as follows: The concentrate obtained is of high quality, having particular reference to flavor, aroma, general appearance and solids subject to settlement. Contrary to prior aqueous coffee concentrates, it is not readily subject to spoilage, and it can be stored without refrigeration. When placed in sealed cans as described above it is not necessary to subject the cans to high temperature retorting, as is commonly done in the canning industry. The yield produced by the process, that is the amount of useable aqueous concentrate produced per pound of roast coffee, is relatively high. The quality of the concentrate is not subject to wide variations, and therefore the desired characteristics can be obtained with a high degree of reliability.

All of the advantages and characteristics described above are attributed to use of the special gas. Apparently the special gas has some unique effect upon the extractable constituents of the roast coffee, whereby such constituents are not only extractable with better flavor and aroma, but in addition are more amenable to extraction, thus making possible a greater yield. Also, the special gas appears to prevent or minimize the extraction of bitter flavor components, and serve to minimize solids subject to settlement in the concentrate. The preserving action of the special gas upon the concentrate is probably due to the destruction of inhibiting of bio-catalysts as described in said Patent 2,490,951, having reference particularly to bio-catalysts associated with enzymatic activity.

When my concentrate is used for making coffee beverage, a small amount of the concentrate is diluted or dissolved in hot water in proportions to suit the taste. By way of example, one-half ounce (fluid) of the concentrate can be employed to make one cup of coffee beverage.

My process is relatively economical with respect to its use of the special gas. For example in the various operations, the amount of special gas employed per pound of roast ground coffee, may be of the order of 250 to 900 cubic feet of gas (at 60° F.) for each 100 pounds of ground coffee. The cost of generating the gas in such quantities constitutes a minor percentage of the total cost of the process.

I claim:

1. In a method for the manufacture of an aqueous coffee concentrate, grinding roasted coffee and extracting with percolating hot water an aqueous concentrate of the ground coffee while said coffee is enveloped with a gaseous atmosphere substantially devoid of oxygen and containing gaseous components resulting from the burning of a hydrocarbon fuel with an amount of air insufficient to complete combustion of the same, said components including carbon dioxide, carbon monoxide, and small amount of unsaturates.

2. In a method for the manufacture of an aqueous coffee concentrate, roasting and grinding coffee while said coffee is enveloped with a gaseous atmosphere substantially devoid of oxygen and containing gaseous components resulting from the burning of a hydrocarbon fuel with an amount of air insufficient to complete combustion of the same, said components including carbon dioxide, carbon monoxide, acetylene, and small amount of unsaturates, and then extracting an aqueous concentrate from the ground coffee by percolating hot water through a mass of the same while enveloped with said gaseous atmosphere.

3. In a method for the manufacture of an aqueous coffee concentrate, the steps of grinding roasted coffee bean in a special gaseous atmosphere substantially devoid of oxygen and containing gaseous components resulting from the burning of a hydrocarbon fuel with an amount of air insufficient for complete combustion of the same, said components including carbon dioxide, carbon monoxide, and small amounts of unsaturates, storing the ground coffee in a closed space to permit substantial evolution of carbon dioxide from the same, then subjecting the ground roast coffee to vacuumizing followed by enveloping the roast ground coffee in the same gaseous atmosphere as aforesaid and then extracting an aqueous coffee concentrate from the roast ground coffee by percolating hot water through the same while enveloped with said gaseous atmosphere.

4. A method as in claim 3 in which the hot water used for said percolating step has been sparged with the same special gaseous atmosphere.

5. In a method for the manufacture of an aqueous coffee concentrate, the steps of grinding roasted coffee bean in a special gaseous atmosphere substantially devoid of oxygen and containing gaseous components resulting from the burning of a hydrocarbon fuel with an amount of air insufficient to complete combustion of the same, the components including carbon dioxide, carbon monoxide, acetylene and small amounts of unsaturates, storing the ground coffee in a closed space for a substantial period of time to permit evolution of carbon dioxide from the same, subjecting the ground coffee after storage to vacuumizing followed by contact of the ground coffee with such special gaseous atmosphere, percolating hot water through a mass of the ground coffee to extract an aqueous coffee concentrate from the same, sparging the hot water used for said percolating operation with said special gaseous atmosphere, and continuously supplying said special gaseous atmosphere to the mass of ground coffee undergoing percolation.

6. A method as in claim 5 in which the aqueous coffee concentrate is placed in sealed containers for marketing while enveloped in a drying atmosphere of special gas.

7. A method as in claim 5 in which the aqueous coffee concentrate is subjected to spray drying to form a powdered product.

References Cited in the file of this patent

UNITED STATES PATENTS

| | | |
|---|---|---|
| 2,062,109 | Rogers | Nov. 24, 1936 |
| 2,490,951 | Dunkley | Dec. 13, 1949 |
| 2,569,217 | Bagdigiar | Sept. 25, 1951 |
| 2,771,364 | Chase et al. | Nov. 20, 1956 |
| 2,788,276 | Reich | Apr. 9, 1957 |